(12) United States Patent
Aoki (10) Patent No.: US 11,079,485 B2
(45) Date of Patent: Aug. 3, 2021

(54) ANTENNA DEVICE

(71) Applicant: DENSO CORPORATION, Kariya (JP)

(72) Inventor: Kazuhiro Aoki, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/911,271

(22) Filed: Jun. 24, 2020

(65) Prior Publication Data

US 2020/0326421 A1    Oct. 15, 2020

Related U.S. Application Data

(63) Continuation of application No. PCT/JP2018/047618, filed on Dec. 25, 2018.

(30) Foreign Application Priority Data

Dec. 26, 2017 (JP) .............................. JP2017-249088

(51) Int. Cl.
*G01S 13/87* (2006.01)
*G01S 7/03* (2006.01)
*H01Q 21/06* (2006.01)

(52) U.S. Cl.
CPC .............. *G01S 13/878* (2013.01); *G01S 7/03* (2013.01); *H01Q 21/06* (2013.01)

(58) Field of Classification Search
CPC .......... G01S 13/878; G01S 7/03; H01Q 21/06
See application file for complete search history.

(56) References Cited

U.S. PATENT DOCUMENTS

| 5,576,718 | A | * | 11/1996 | Buralli ................ | H01Q 19/005 343/700 MS |
| 8,390,507 | B2 | * | 3/2013 | Wintermantel ...... | H01Q 9/0407 342/70 |
| 9,541,639 | B2 | * | 1/2017 | Searcy ...................... | G01S 7/03 |
| 10,620,305 | B2 | * | 4/2020 | Comic ................ | H01Q 1/3233 |
| 2008/0303711 | A1 | * | 12/2008 | Matsuoka ................. | G01S 3/32 342/196 |
| 2011/0074620 | A1 | * | 3/2011 | Wintermantel ......... | G01S 7/285 342/70 |
| 2011/0074621 | A1 | | 3/2011 | Wintermantel | |
| 2011/0080313 | A1 | | 4/2011 | Wintermantel et al. | |
| 2011/0080314 | A1 | | 4/2011 | Wintermantel | |
| 2014/0306840 | A1 | * | 10/2014 | Koerber ................. | G01S 7/032 342/107 |

(Continued)

*Primary Examiner* — Marcus E Windrich
(74) *Attorney, Agent, or Firm* — Maschoff Brennan (57) ABSTRACT

Transmission antennas are aligned at a reference distance along a preset direction of alignment. The aperture width of a first reception antenna in the direction of alignment is set to a first width which is less than the reference distance. Second reception antennas each have an aperture width in the direction of alignment set to a second width which is the first width or less and are aligned at a distance which is less than the reference distance along the direction of alignment. The distance between the position of the center of the first reception antenna and the phase center of a second reception antennal located closest to the first reception antenna among the second reception antennas is set to a length that is greater than or equal to the value obtained by multiplying the reference distance by the value obtained by subtracting 1 from the number of transmission antennas.

7 Claims, 11 Drawing Sheets

(56) References Cited

U.S. PATENT DOCUMENTS

| | | | |
|---|---|---|---|
| 2016/0025839 A1* | 1/2016 | Trummer | H01Q 1/3233 |
| | | | 342/109 |
| 2016/0033632 A1* | 2/2016 | Searcy | G01S 13/4454 |
| | | | 342/153 |
| 2016/0172767 A1* | 6/2016 | Ray | H01Q 21/22 |
| | | | 343/893 |

* cited by examiner

REFLECTION COEFFICIENT: R

CHANGE IN PHASE IN TRANSMISSION PATH (TX1 → OBJECT): $\alpha_T$

CHANGE IN PHASE IN RECEPTION PATH (OBJECT → RX1): $\alpha_R$

MRR ARRAY

FIG.8

LRR ARRAY

FIG.9

VERTICAL ARRAY

ANTENNA DEVICE

CROSS-REFERENCE TO RELATED APPLICATION

This application is based on and claims the benefit of priority from Japanese Patent Application No. 2017-249088 filed with the Japan Patent Office on Dec. 26, 2017, the description of which is incorporated herein by reference.

BACKGROUND

Technical Field

The present disclosure relates to an antenna device that implements plural types of array antennas having different reception antenna distances.

Related Art

A technique is disclosed which is for disposing two transmission antennas at separate positions and disposing a plurality of reception antennas between these transmission antennas to provide, with a small area, twice as many channels as the number of reception antennas. Note that the channel represents a path for signals from one of the transmission antennas to reach one of the reception antennas by being reflected by an object to be detected.

SUMMARY

As an aspect of the embodiment, an antenna device is provided which includes: a plurality of transmission antennas aligned at a reference distance along a direction of alignment, the reference distance and the direction of alignment being preset; a first reception antenna having an aperture width in the direction of alignment set to a first width which is less than the reference distance; and a plurality of second reception antennas each having an aperture width in the direction of alignment set to a second width which is less than or equal to the first width, the plurality of second reception antennas being aligned at a distance which is less than the reference distance along the direction of alignment. A distance along the direction of alignment between a phase center of the first reception antenna and a phase center of a second reception antenna located closest to the first reception antenna among the plurality of second reception antennas is set to a length that is greater than or equal to a value obtained by multiplying the reference distance by a value obtained by subtracting 1 from the total number of the transmission antennas.

DETAILED DESCRIPTION OF THE PREFERRED EMBODIMENTS

JP-T-2011-526371 discloses a technique for disposing two transmission antennas at separate positions and disposing a plurality of reception antennas between these transmission antennas to provide, with a small area, twice as many channels as the number of reception antennas. Note that the channel represents a path for signals from one of the transmission antennas to reach one of the reception antennas by being reflected by an object to be detected.

However, as a result of in-depth research conducted by the inventor, the known technology disclosed in JP-T-2011-526371 has been found to have the following problem.

Specifically, in the known technology, for example, in the case where there is a need to achieve both of a reception antenna distance for detecting the direction of an object at a narrow angle with accuracy and a reception antenna distance for detecting the object at a wide angle, two types of antenna devices in which reception antennas are arranged at different distances need to be individually prepared, causing a device enlargement problem.

One aspect of the present disclosure is to provide an antenna device implementing plural types of array antennas having different reception antenna distances with a simple configuration.

Hereinafter, embodiments according to the present disclosure will be described with reference to the drawings.

1. First Embodiment

1-1. Configuration

Figure 1:
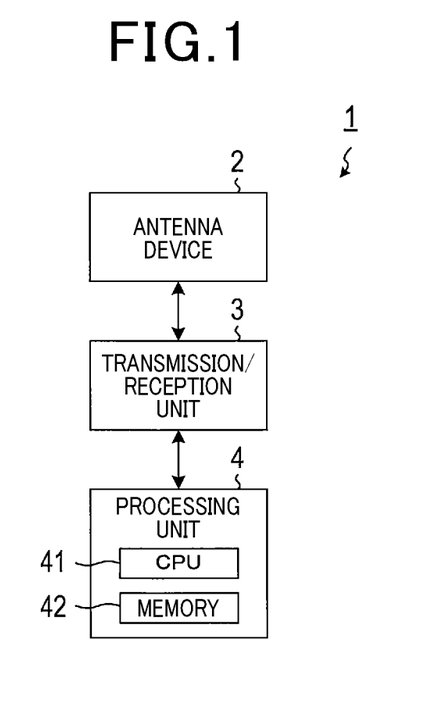
FIG. 1 is a block diagram showing the configuration of a radar device to which an antenna device is applied.

A radar device 1 according to the first embodiment, shown in FIG. 1, is installed and used in a vehicle and is used to detect various objects present around the vehicle. The radar device 1 is a MIMO radar which simultaneously transmits and receives radio waves using a plurality of antennas. MIMO stands for multi-input multi-output.

The radar device 1 includes an antenna device 2 according to the present embodiment. The radar device 1 may further include a transmission/reception unit 3 and a processing unit 4.

1-1-1. Antenna Device

Figure 2:
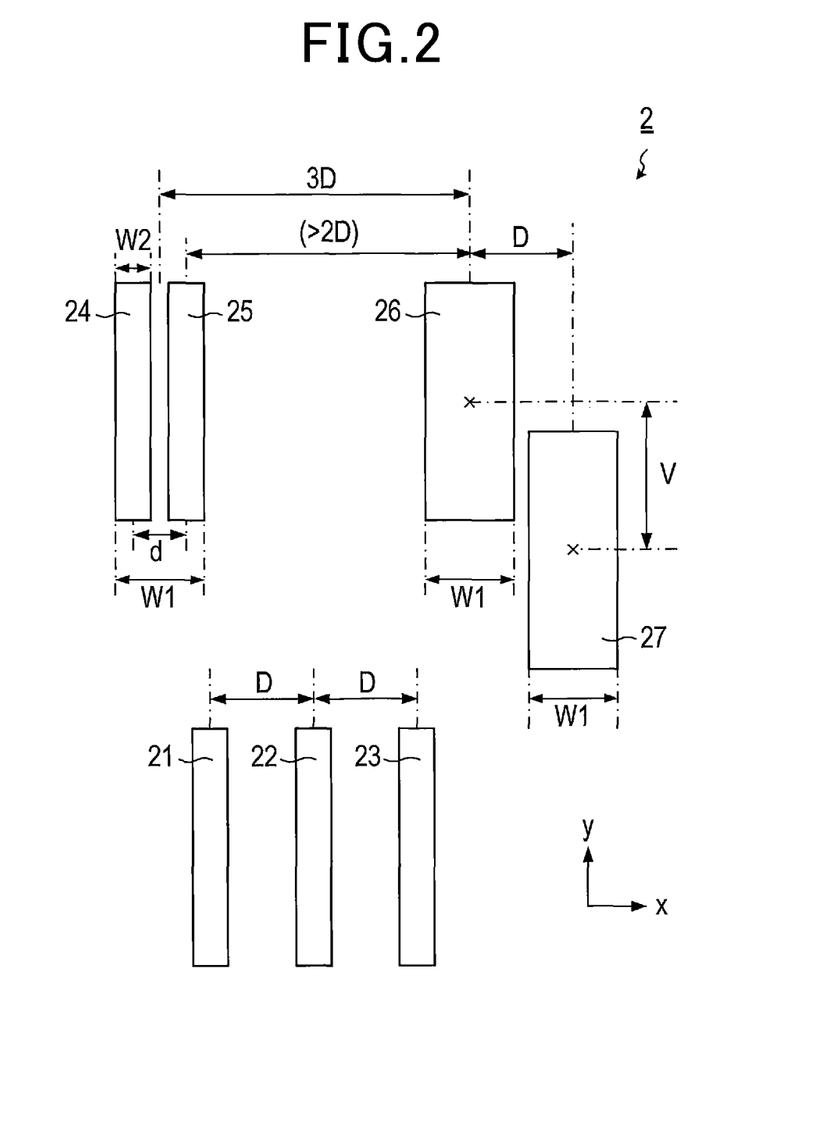
FIG. 2 is an explanatory diagram showing the arrangement of antennas in an antenna device according to the first embodiment.

As shown in FIG. 2, the antenna device 2 includes three transmission antennas 21 to 23 and four reception antennas 24 to 27. The number of transmission antennas and the number of reception antennas are not limited to these numbers; it is sufficient that at least two transmission antennas and at least two reception antennas be provided. Each of the antennas 21 to 27 is provided using a copper-foil pattern formed on a dielectric substrate, for example.

As shown in FIG. 2, three transmission antennas 21 to 23 are arranged at a preset reference distance D in a single line along a preset direction of alignment. Hereinafter, this direction of alignment will be referred to as an x-axis direction, and a direction orthogonal to the direction of alignment will be referred to as a y-axis direction. The transmission antennas 21 to 23 have the same shape and the same size.

The aperture widths of the four reception antennas 24 to 27 in the y-axis direction are the same.

The aperture widths of the two reception antennas 26, 27 in the x-axis direction are each set to a first width W1 which is less than the reference distance D. The reception antenna 27 is disposed at a position defined by shifting the reception antenna 26 the reference distance D in the x-axis direction and further, a preset vertical distance V in the y-axis direction.

The aperture widths of the two other reception antennas 24, 25 in the x-axis direction are each set to a second width W2 which is less than the first width W1. The reception antenna 25 is disposed at a position defined by shifting the reception antenna 24 a preset distance d in the x-axis direction. The second width W2 and the distance d are set so that the circumscribed geometric shape of the two reception antennas 24, 25 has the same shape and the same size as each of the reception antennas 26, 27. In other words, the aperture widths of a combined antenna formed of two reception antennas 24, 25 (hereinafter, a combined antenna 24-25) in the x-axis direction and the y-axis direction are the same as those of each of the two other reception antennas 26, 27.

The reception antenna 26 is disposed at a position defined by shifting the combined antenna 24-25 in the x-axis direction a distance 3D obtained by multiplying the reference distance D by the number of transmission antennas.

The transmission antennas 21 to 23 are arranged at positions defined by shifting the reception antennas 24 to 27 in the y-axis direction in such a manner as not to overlap any of the reception antennas 24 to 27. Furthermore, the transmission antennas 21 to 23 are arranged so that the position of the phase center of each of the transmission antennas 21 to 23 in the x-axis direction is located between the phase center of the reception antenna 25 and the phase center of the reception antenna 26. This means that the distance between the phase center of the reception antenna 25 and the phase center of the reception antenna 26 is set greater than 2D.

Note that the phase center is a point of incoming or outgoing radio waves that is virtually regarded as a point of concentration of the radio waves. In the case where an antenna has a vertically and horizontally symmetrical shape such as a rectangle or a circle, the phase center substantially matches the position of the center of gravity of the antenna.

Figure 3:
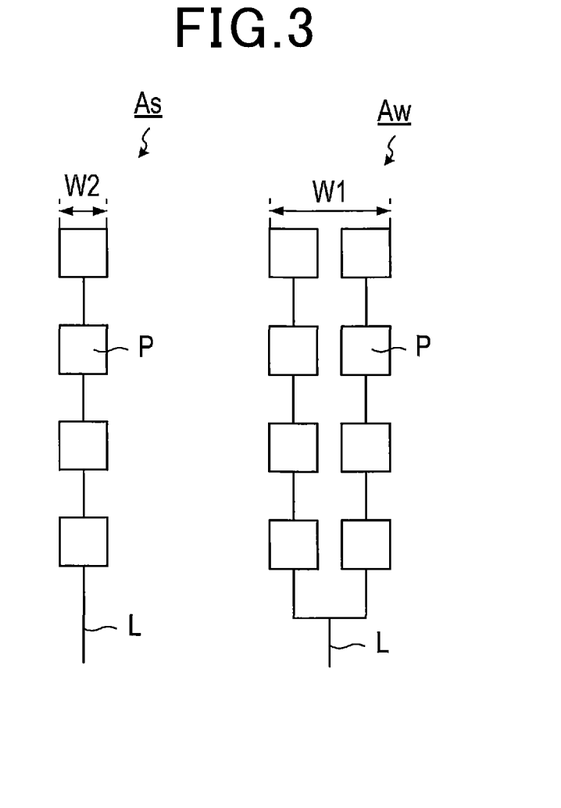
FIG. 3 is a pattern diagram showing a specific example of transmission antennas and reception antennas.

Here, a specific example of each of the transmission antennas 21 to 23 and the reception antennas 24 to 27 will be described with reference to FIG. 3. The transmission antennas 21 to 23 and the reception antennas 24, 25 each having the aperture width in the x-axis direction set to the second width W2 includes a plurality of patch antennas P arranged in a single line along the y-axis direction and a power supply line L laid out so that electricity is supplied to the patch antennas in the same phase. The reception antennas 26, 27 each having the aperture width in the x-axis direction set to the first width W1 has a structure in which the patch antennas P are arranged in two lines and power supply lines L are connected to both of the two lines of the patch antennas P.

1-1-2. Virtual Array

Figure 4:
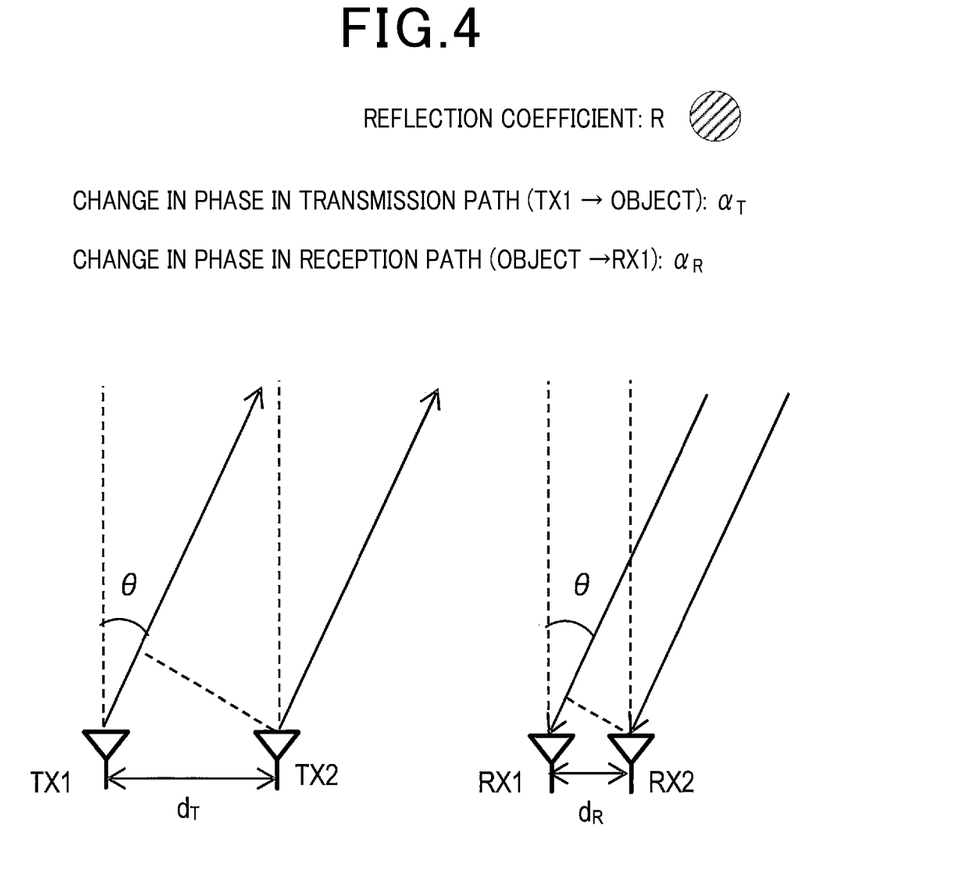
FIG. 4 is an explanatory diagram showing a relationship between a target and the transmission and reception antennas.

Here, with reference to FIGS. 4 and 5, a virtual array of M×N antennas including M transmission antennas and N reception antennas will be described. As shown in FIG. 4, the case where M is 2, N is 2, two transmission antennas TX1, TX2 are arranged at a first distance dT, and two reception antennas RX1, RX2 are arranged at a second distance dR will be described.

Suppose that an object to be detected is present in a direction at an angle θ with respect to the direction forward of the transmission antennas TX1, TX2 and the reception antennas RX1, RX2. The coefficient of reflection by the object is denoted as R, a change in the phase of a signal in a path from TX1 to the object is denoted as αT, and a change in the phase of a signal in a path from the object to RX1 is denoted as αR. Note that αT and αR are represented by complex numbers.

In this case, a signal that is transmitted from TX1 and received by RX1 is represented by Expression (1). A signal that is transmitted from TX1 and received by RX2 is represented by Expression (2). A signal that is transmitted from TX2 and received by RX1 is represented by Expression (3). A signal that is transmitted from TX2 and received by RX2 is represented by Expression (4).

Expression 1

$$\alpha_T \cdot R \cdot \alpha_R \quad (1)$$

$$\alpha_T \cdot R \cdot \alpha_R \cdot \exp(jkd_R \sin\theta) \quad (2)$$

$$\alpha_T \cdot R \cdot \alpha_R \cdot \exp(jkd_T \sin\theta) \quad (3)$$

$$\alpha_T \cdot R \cdot \alpha_R \cdot \exp(jk(d_T+d_R)\sin\theta) \quad (4)$$

Figure 5:
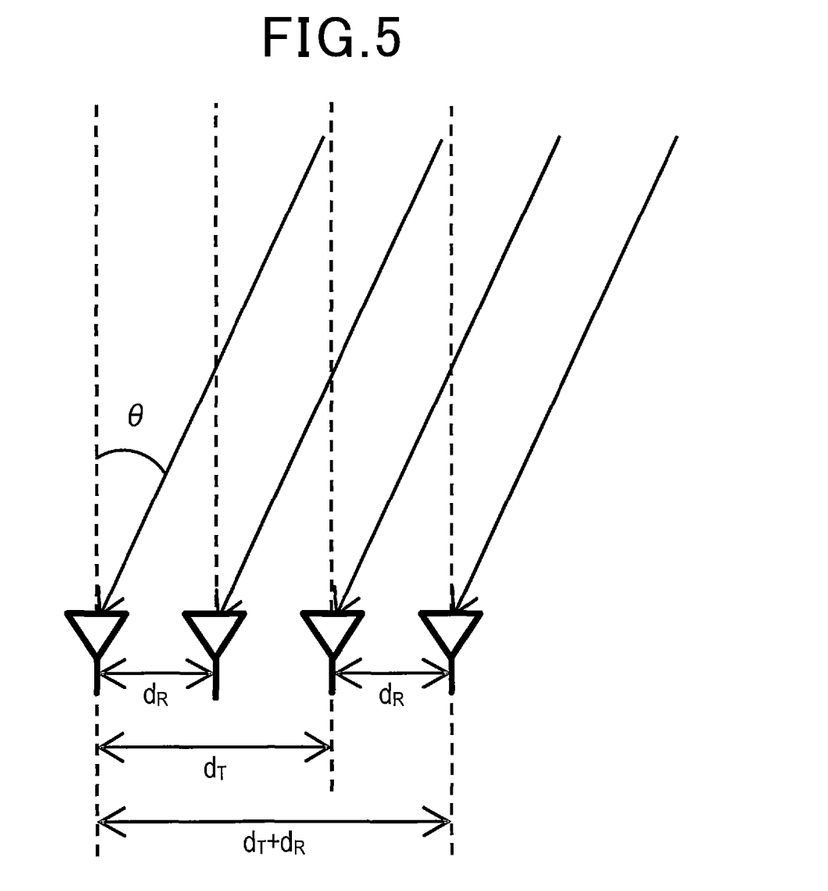
FIG. 5 is an explanatory diagram showing the arrangement of virtual reception antennas in a virtual array.

As shown in FIG. 5, these expressions are equivalent to those in the case where a signal transmitted from one transmission antenna is received by four reception antennas arranged at respective distances $d_R$, $d_T$, and $d_T+d_R$. The virtual reception antennas arranged in this manner are referred to as a virtual array.

Figure 6:
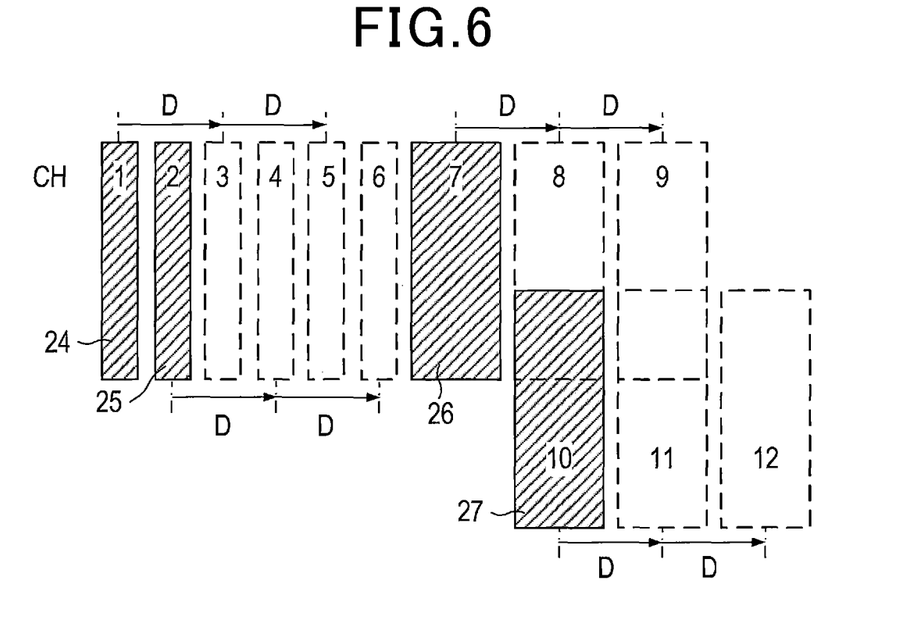
FIG. 6 is an explanatory diagram showing the arrangement of a virtual array implemented in the antenna device.

In other words, as shown in FIG. 6, in the antenna device 2, the combination of the three transmission antennas 21 to 23 and the four reception antennas 24 to 27 serves as a virtual array including 12 virtual reception antennas. Specifically, virtual reception antennas represented by the dashed lines in FIG. 6 are formed at positions defined by respectively shifting the four reception antennas 24 to 27 represented by the solid lines in FIG. 6 a distance D and a distance 2D in the x-axis direction.

Hereinafter, the reception antennas 24, 25 will be referred to as channels CH1, CH2, virtual reception antennas located at positions defined by shifting the reception antennas 24, 25 the distance D will be referred to as channels CH3, CH4, and virtual reception antennas located at positions defined by further shifting the reception antennas 24, 25 the distance D will be referred to as channels CH5, CH6. Furthermore, the reception antenna 26 will be referred to as a channel CH7, a virtual reception antenna located at a position defined by shifting the reception antenna 26 the distance D will be referred to as a channel CH8, and a virtual reception antenna located at a position defined by further shifting the reception antenna 26 the distance D will be referred to as a channel CH9. Furthermore, the reception antenna 27 will be referred to as a channel CH10, a virtual reception antenna located at a position defined by shifting the reception antenna 27 the distance D will be referred to as a channel CH11, and a virtual reception antenna located at a position defined by further shifting the reception antenna 27 the distance D will be referred to as a channel CH12. Note that the reception antenna 26 corresponds to a first reception antenna, the reception antennas 24, 25 correspond to a second reception antennas, and the reception antenna 27 corresponds to an additional reception antenna.

Figure 7:
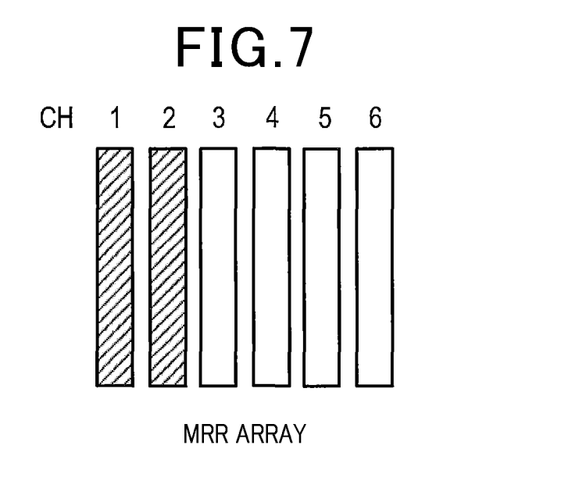
FIG. 7 is an explanatory diagram showing an MRR array which is a virtual array used in a mid-range mode.

As shown in FIG. 7, the channels CH1 to CH6 form an evenly spaced 6-element array (hereinafter, an MRR array) in which the channels are arranged at the distance d in the x-axis direction.

Figure 8:
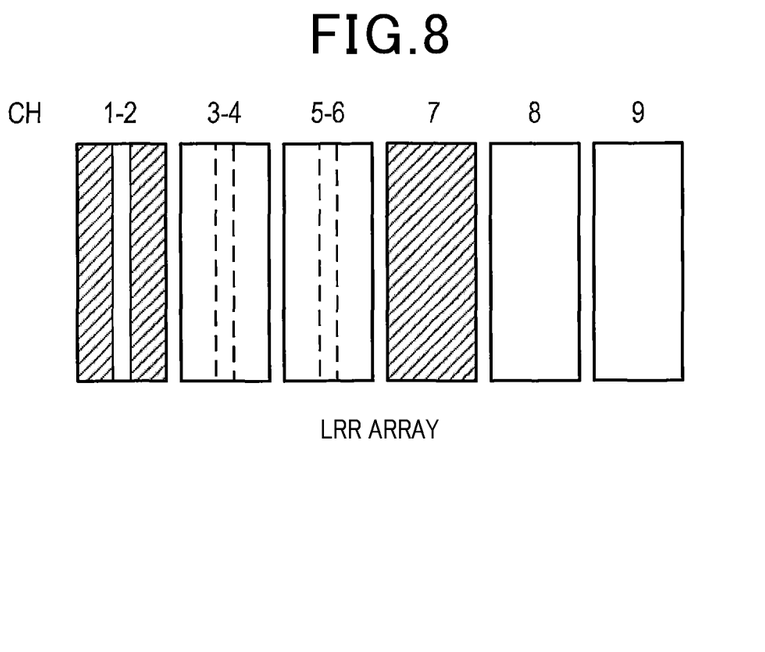
FIG. 8 is an explanatory diagram showing an LRR array which is a virtual array used in a long-range mode.

The combined antenna formed of the pair of the channels CH1 and CH2, the combined antenna formed of the pair of the channels CH3 and CH4, and the combined antenna formed of the pair of the channels CH5 and CH6 are denoted as a channel CH1-2, a channel CH3-4, and a channel CH5-6, respectively. As shown in FIG. 8, the channels CH1-2, CH3-4, CH5-6, and CH7 to CH9 form an evenly spaced 6-element array (hereinafter, an LRR array) in which the channels are arranged at the distance D in the x-axis direction.

Figure 9:
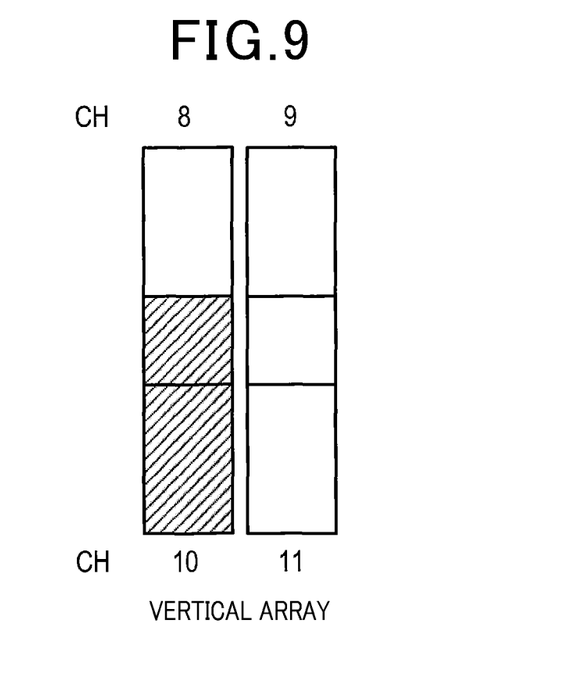
FIG. 9 is an explanatory diagram showing a vertical array which is a virtual array used in a vertical angle measurement mode.

As shown in FIG. 9, the pair of channels CH8 and CH10 and the pair of channels CH9 and CH11 each form a 2-element array (hereinafter, a vertical array) in which the channels are arranged at a distance V in the y-axis direction.

1-2. Transmission/Reception Unit

The transmission/reception unit 3 supplies transmission signals to the respective transmission antennas 21 to 23. The transmission/reception unit 3 modulates each of the transmission signals by a doppler division multiple access (hereinafter DDMA) method. The DDMA method is a modulation method for enabling identification of individual signals from reception signals on which two or more signals simultaneously transmitted from two or more transmission antennas have been superimposed. The DDMA method is a technique used in a MIMO radar, for example.

The transmission/reception unit 3 generates a beat signal for each of the reception antennas 24 to 27 by mixing a local signal that is a transmission signal serving as a reference among the above-described transmission signals into each of the reception signals supplied from the respective reception antennas 24 to 27, and then supplies the beat signal to the processing unit 4.

1-3. Processing Unit

The processing unit 4 includes a microcomputer including a CPU 41 and semiconductor memory (hereinafter, memory 42) such as RAM or ROM, for example. Each function of the processing unit 4 is implemented by the CPU 41 executing a program stored in a non-transitory tangible recording medium. In this example, the memory 42 corresponds to the non-transitory tangible recording medium having the program stored therein. Furthermore, when this program is executed, a method corresponding to the program is performed. Note that the processing unit 4 may include a single microcomputer or may include two or more microcomputers.

The processing unit 4 performs at least a target detection process. The method for implementing each function of the processing unit 4 is not limited to a method in which software is used; a part or all of the functions of the processing unit 4 may be implemented using one or more hardware products. For example, in the case where this function is implemented using an electronic circuit which is a hardware product, the electronic circuit may be provided in the form of a digital circuit, an analog circuit, or a combination of these circuits.

1-4. Processing

Figure 10:
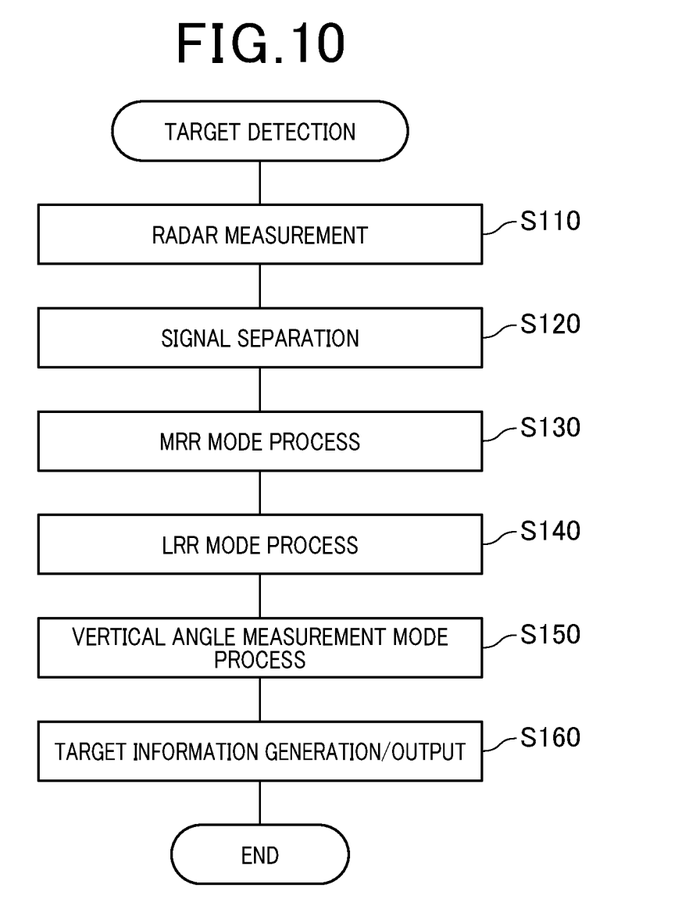
FIG. 10 is a flowchart of a target detection process performed by a processing unit.

Next, the target detection process performed by the processing unit 4 will be described with reference to the flowchart in FIG. 10. When the processing unit 4 is activated, the target detection process is periodically performed.

First, in S110, the processing unit 4 performs radar measurement by operating the transmission/reception unit 3 and obtains sampling data of the beat signal supplied from each of the reception antennas 24 to 27.

In S120, on the basis of the sampling data obtained in S110, the processing unit 4 extracts signals of 12 channels in the virtual array. Specifically, an FFT process or the like is performed for each of the reception antennas 24 to 27, and thus a Doppler spectrum representing Doppler frequency components included in the reception signals is calculated. In other words, since the transmission signals resulting from the DDMA modulation have different amounts of phase rotation for the respective transmission antennas, the transmission signals from the respective transmission antennas are extracted as signal components having different Doppler frequencies on a Doppler spectrum. Thus, signals of channels CH1, CH3, CH5 are extracted from the signals received by the reception antenna 24. Signals of channels CH2, CH4, CH6 are extracted from the signals received by the reception antenna 25. Signals of channels CH7 to CH9 are extracted from the signals received by the reception antenna 26. Signals of channels CH10 to CH12 are extracted from the signals received by the reception antenna 27.

In S130, the processing unit 4 performs a mid-range radar (hereinafter, MRR) mode process. In the MRR mode process, using the signals of the channels CH1 to CH6 belonging to the MRR array shown in FIG. 7, a target present in a mid-range, wide-angle range is detected, for example, by a digital beam forming (hereinafter, DBF) method or the like.

In S140, the processing unit 4 performs a long-range radar (hereinafter, LRR) mode process. In the LRR mode process, using the signals of combined channels CH1-2, CH3-4, and CH5-6, and channels CH7 to CH9 which belong to the LRR array shown in FIG. 8, a target present in a long-range, narrow-angle range is detected, for example, by a MUSIC method or the like. Note that in the LRR mode process, the result of the MRR mode process may be used to perform, for example, a process for determining the direction to the target which is made uncertain by grating.

In S150, the processing unit 4 performs a vertical angle measurement mode process. In the vertical angle measurement mode process, signals obtained from at least one of the pair of the channels CH8 and CH10 and the pair of the channels CH9 and CH11 which belong to the vertical array shown in FIG. 9 are used. Subsequently, for example, using the DBF or monopulse method, the angle in the vertical direction and furthermore, the position in the height direction, of the target detected in S130 and S140 are calculated.

In S160, using the detection result obtained in S130 to S150, the processing unit 4 generates target information which is information about the target present in the search range, outputs the target information to a downstream device that performs various processes using the target information, and ends the present process.

1-5. Advantageous Effects

In the present embodiment described above in detail, the following advantageous effects are produced.

(1a) In the antenna device 2, conversely to the conventional device, the transmission antennas 21 to 23 are located between the reception antenna 24 to 27, and the plurality of reception antennas 24, 25 are arranged at the distance d which is less than the reference distance D in one direction of alignment when viewed from the transmission antennas 21 to 23 side. Thus, the reception antennas in the virtual array formed of the transmission antennas 21 to 23 and the reception antennas 24, 25 (that is, the MRR array) and the reception antennas in the virtual array formed of the transmission antennas 21 to 23 and the reception antennas 26, 27 (that is, the LRR array) are arranged at different distances. In this manner, with the antenna device 2, two virtual arrays having different grating lobes can be implemented with a configuration that is as simple as the configuration of the conventional device.

(1b) The antenna device 2 is configured so that the circumscribed geometric shape of the reception antennas 24, 25 has the same shape and the same size as the reception antennas 26. Therefore, the virtual array formed of the transmission antennas 21 to 23 and the combined antennas resulting from a combination of the reception antennas 24, 25 (i.e., channels CH1-2, CH3-4, CH5-6) can be used as a part of the virtual array formed of the transmission antennas 21 to 23 and the reception antenna 26 (i.e., channels CH7 to CH9).

(1c) In the antenna device 2, the distance between the phase center of the reception antenna 24 and the phase center of the reception antenna 25 may be set less than 0.5 λ where λ represents the wavelength used. In this case, the use of the MRR array enables an angle measurement process that does not cause angular ambiguity.

(1d) With the antenna device 2, in the case where the LRR array is used, an angle measurement process that achieves high direction accuracy or high angular resolution, for example, can be performed. Furthermore, since the aperture of each channel in the LRR array is larger than that in the MRR array, the antenna gain can be higher, and an object located at a greater distance can be detected. Note that with the LRR array, the angular ambiguity due to the grating lobe occurs because of an increased distance between the reception antennas, but the angular ambiguity may be solved using the MRR array in combination.

(1e) In the antenna device 2, the reception antenna 27 is provided at a position defined by shifting the reception antenna 26 in the y-axis direction. Therefore, the vertical array can provided; the use of the vertical array allows detection of not only an angle in the x-axis direction, but also an angle in the y-axis direction.

2. Second Embodiment

2-1. Differences From First Embodiment

The basic configuration in the second embodiment is substantially the same as that in the first embodiment; thus, differences will be described below. Note that reference signs identical to those in the first embodiment represent the same elements as those in the first embodiment, and thus preceding description will be referred to.

Figure 11:
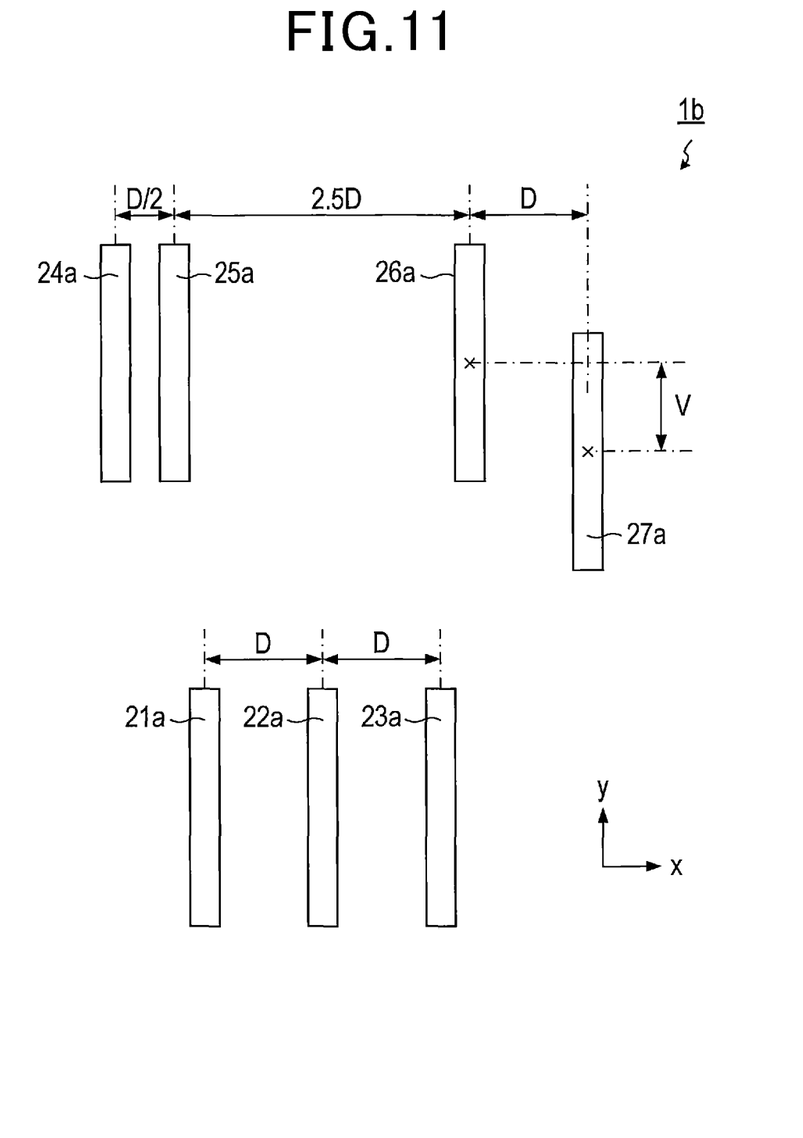
FIG. 11 is an explanatory diagram showing the arrangement of antennas in an antenna device according to the second embodiment.

In the above-described first embodiment, the aperture width of each of the reception antennas 24, 25 in the x-axis direction and the aperture width of each of the reception antennas 26, 27 in the x-axis direction are different. The second embodiment is different from the first embodiment in that the reception antennas have the same aperture width and in that the reception antennas are arranged at different distances.

2-2. Antenna Device

As shown in FIG. 11, an antenna device 2a in the present embodiment includes transmission antennas 21a to 23a and reception antennas 24a to 26a.

The transmission antennas 21a to 23a have substantially the same shape as the shape of the transmission antennas 21 to 23 in the first embodiment and are arranged in substantially the same manner as the transmission antennas 21 to 23 in the first embodiment. However, the aperture width of each of the transmission antennas 21a to 23a in the x-axis direction is set less than 0.5 times the reference distance D.

The reception antennas 24a to 27a have substantially the same shape as the shape of the transmission antennas 21a to 23a.

The reception antennas 24a to 27a are arranged as follows using the position of the reception antenna 24a as a reference. The reception antenna 25a is disposed at a position defined by shifting the reception antenna 24a 0.5 times the reference distance D in the x-axis direction. The reception antenna 27a is disposed at a position defined by shifting the reception antenna 25a 2.5 times the reference distance D in the x-axis direction. The reception antenna 27a is disposed at a position defined by shifting the reception antenna 26a the reference distance D in the x-axis direction and further, the vertical distance V in the y-axis direction.

The transmission antennas 21a to 23a are disposed at positions defined by shifting the reception antennas 24a to 27a in the y-axis direction in such a manner as not to overlap any of the reception antennas 24a to 27a.

Furthermore, the transmission antennas 21a to 23a are arranged so that the position of the phase center of each of the transmission antennas 21a to 23a in the x-axis direction is located between the phase center of the reception antenna 25a and the phase center of the reception antenna 26a.

2-3. Virtual Array

Figure 12:
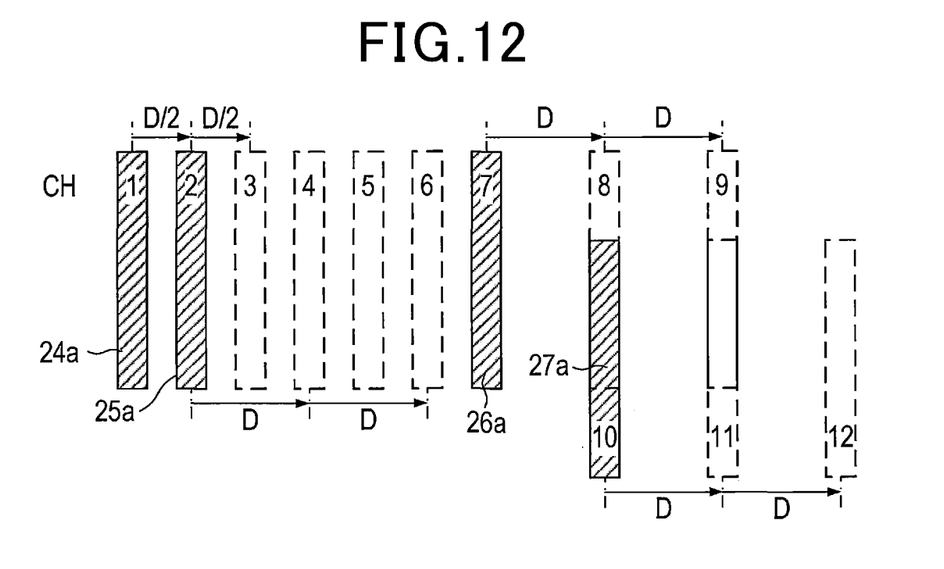
FIG. 12 is an explanatory diagram showing the arrangement of a virtual array implemented in the antenna device.

As shown in FIG. 12, with the antenna device 2a, a virtual array including 12 virtual reception antennas is obtained by combining the three transmission antennas 21a to 23a and the four reception antennas 24a to 27a. Specifically, virtual reception antennas represented by the dashed lines in FIG. 12 are formed at positions defined by respectively shifting the four reception antennas 24a to 27a represented by the solid lines in FIG. 12 the distance D and the distance 2D in the x-axis direction.

Hereinafter, the reception antennas 24a, 25a will be referred to as channels CH1, CH2, virtual reception antennas located at positions defined by shifting the reception antennas 24a, 25a the distance D will be referred to as channels CH3, CH4, and virtual reception antennas located at positions defined by further shifting the reception antennas 24a, 25a the distance D will be referred to as channels CH5, CH6.

Furthermore, the reception antenna 26a will be referred to as a channel CH7, a virtual reception antenna located at a position defined by shifting the reception antenna 26a the distance D will be referred to as a channel CH8, and a virtual reception antenna located at a position defined by further shifting the reception antenna 26a the distance D will be referred to as a channel CH9. Furthermore, the reception antenna 27a will be referred to as a channel CH10, a virtual reception antenna located at a position defined by shifting the reception antenna 27a the distance D will be referred to as a channel CH11, and a virtual reception antenna located at a position defined by further shifting the reception antenna 27a the distance D will be referred to as a channel CH12. Note that the reception antenna 26a corresponds to a first reception antenna, the reception antennas 24a, 25a correspond to a second reception antennas, and the reception antenna 27a corresponds to an additional reception antenna.

Figure 13:
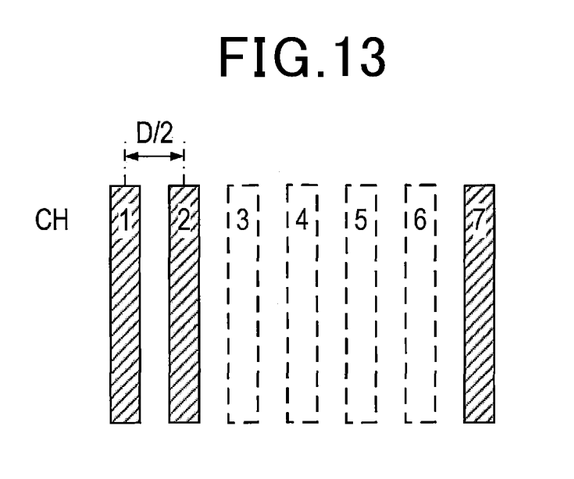
FIG. 13 is an explanatory diagram showing an MRR array which is a virtual array used in the mid-range mode.

As shown in FIG. 13, the channels CH1 to CH7 form an evenly spaced 7-element array (hereinafter, an MRR array) in which the channels CH1 to CH7 are arranged at a distance D/2 in the x-axis direction.

Figure 14:
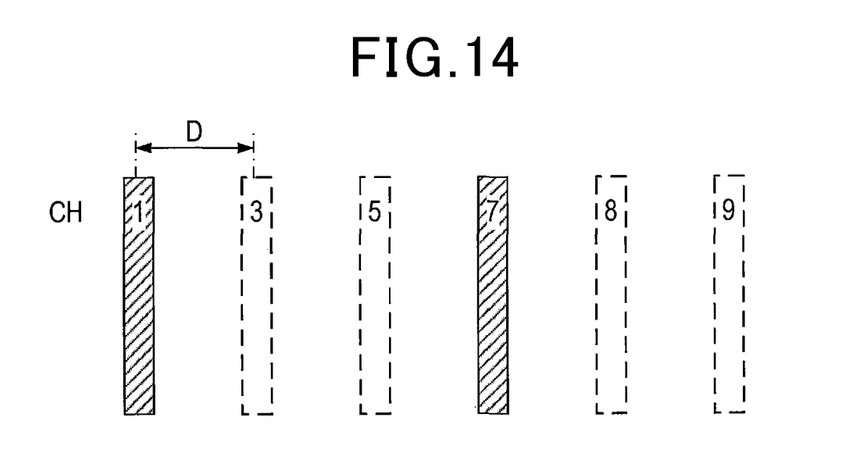
FIG. 14 is an explanatory diagram showing an LRR array which is a virtual array used in the long-range mode.

As shown in FIG. 14, CH1, CH3, CH5, CH7, CH8, and CH9 form an evenly spaced 6-element array (hereinafter, an LRR array) in which the channels are arranged at the distance D in the x-axis direction.

Figure 15:
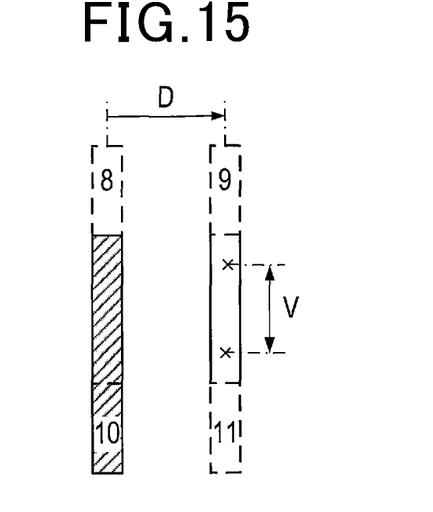
FIG. 15 is an explanatory diagram showing a vertical array which is a virtual array used in the vertical angle measurement mode.

As shown in FIG. 15, the pair of channels CH8 and CH10 and the pair of channels CH9 and CH11 each form a 2-element array (hereinafter, a vertical array) in which the channels are arranged at the distance V in the y-axis direction.

2-4. Advantageous Effects

In the second embodiment described above in detail, the aforementioned advantageous effects (1a) and (1c) to (1e) of the first embodiment are provided and in addition, the following advantageous effect is provided.

(2a) In the antenna device 2a, even with the same number of transmission antennas 21a to 23a and reception antennas 24a to 27a as in the antenna device 2 according to the first embodiment, the number of elements in the MRR array is larger by 1, achieving an MRR array having a large aperture.

3. Other Embodiments

Although the embodiments of the present disclosure have been described above, the present disclosure is not limited to the above-described embodiments and can be implemented with various modifications.

(3a) In the above embodiments, the two reception antennas 24, 25, which are the second reception antennas, have a circumscribed shape that matches the shape of the reception antennas 26, which is the first reception antenna, but the present disclosure is not limited to this example. For example, three or more second reception antennas may have a circumscribed shape that matches the shape of the first reception antenna.

(3b) In the above-described embodiments, the distance between the phase center of the reception antenna 26 and the phase center of the combined antenna resulting from a combination of the plurality of reception antennas 24, 25 is set to an integral multiple of the reference distance D, but this does not necessarily need to be an integral multiple.

(3c) A plurality of functions of one structural element in the above-described embodiments may be implemented by more than one structural element, and one function of one structural element in the above-described embodiments may be implemented by more than one structural element. Furthermore, a plurality of functions of more than one structural element in the above-described embodiments may be implemented by one structural element, and one function implemented by more than one structural element in the above-described embodiments may be implemented by one structural element. A portion of the configurations in the above-described embodiments may be omitted. Furthermore, at least a portion of the configuration in the above-described embodiments may be added to the configuration in another one of the above-described embodiments or may be replaced by the configuration in another one of the above-described embodiments.

(3d) The present disclosure can be implemented in various embodiments such as a system including the above-described antenna device as a structural element, an antenna arrangement method, and the like, aside from the above-described antenna device.

An antenna device according to one aspect of the present disclosure incudes a plurality of transmission antennas (21 to 23, 21a to 23a), a first reception antenna (26, 26a), and a plurality of second reception antennas (24, 25, 24a, 25a).

The plurality of transmission antennas are aligned at a preset reference distance along a preset direction of alignment. The aperture width of the first reception antenna in the direction of alignment is set to a first width which is less than the reference distance. The plurality of second reception antennas each have an aperture width in the direction of alignment set to a second width which is less than or equal to the first width and are aligned at a distance which is less than the reference distance along the direction of alignment. The distance along the direction of alignment between the center position of the first reception antenna and the phase center of a second reception antenna located closest to first reception antenna among the plurality of second reception antennas is set to a length that is greater than or equal to a value obtained by multiplying the reference distance by a value obtained by subtracting 1 from the number of transmission antennas.

With such a configuration, different directivities can be provided using a virtual array including virtual reception antennas formed of the plurality of transmission antennas and the first reception antenna and a virtual array including virtual reception antennas formed of the plurality of transmission antennas and the plurality of second reception antennas. Note that the antennas are arranged at a relatively small distance in the former virtual array, and the antennas are arranged at a relatively large distance in the latter virtual array. In other words, two types of virtual arrays having different grating lobes can be implemented in substantially the same apparatus size as that in the known technology.

What is claimed is:

1. An antenna device comprising:
a plurality of transmission antennas aligned at a reference distance along a direction of alignment, the reference distance and the direction of alignment being preset;
a first reception antenna having an aperture width in the direction of alignment set to a first width which is less than the reference distance; and
a plurality of second reception antennas each having an aperture width in the direction of alignment set to a second width which is less than or equal to the first width, the plurality of second reception antennas being aligned at a distance which is less than the reference distance along the direction of alignment, wherein
a distance along the direction of alignment between a phase center of the first reception antenna and a phase center of a second reception antenna located closest to the first reception antenna among the plurality of second reception antennas is set to a length that is greater than or equal to a value obtained by multiplying the reference distance by a value obtained by subtracting 1 from a total number of the plurality of transmission antennas.

2. The antenna device according to claim 1, wherein the plurality of second reception antennas are arranged so that a circumscribed geometric shape of the plurality of second reception antennas has an area equal to an area of the first reception antenna.

3. The antenna device according to claim 1, wherein the plurality of transmission antennas are arranged so that when viewed in the direction of alignment, a phase center of each of the plurality of transmission antennas is located between a position of a center of the first reception antenna and a position of a center of the second reception antenna located closest to the first reception antenna among the plurality of second reception antennas.

4. The antenna device according to claim 1, further comprising
an additional reception antenna having the same shape as the first reception antenna, wherein
the additional reception antenna is disposed at a position defined by shifting the first reception antenna in a direction orthogonal to the direction of alignment.

5. The antenna device according to claim 4, wherein the additional reception antenna is disposed at a position defined by shifting the first reception antenna a distance greater than or equal to the reference distance in the direction of alignment.

6. The antenna device according to claim 5, wherein an amount of shifting for the additional reception antenna in the direction orthogonal to the direction of alignment is set less than an aperture width of the first reception antenna in the direction orthogonal to the direction of alignment.

7. The antenna device according to claim 1, wherein wherein the plurality of transmission antennas are positioned between the first reception antenna and the plurality of second reception antennas in the direction of alignment.

* * * * *